United States Patent Office.

CAMILLE ALPHONSE FAURE, OF NEW YORK, N. Y.

METHOD OF PREPARING ASBESTUS.

SPECIFICATION forming part of Letters Patent No. 389,210, dated September 11, 1888.

Application filed January 26, 1888. Serial No. 262,040. (No specimens.)

*To all whom it may concern:*

Be it known that I, CAMILLE ALPHONSE FAURE, a citizen of the Republic of France, and a resident of the city, county, and State of New York, have invented certain new and useful Improvements in the Method of Preparing Asbestus, of which the following is a specification.

My invention is an improvement in the art or process of preparing asbestus, whereby it is rendered insoluble in water and acid and its mechanical strength increased, rendering it practically indestructible under the conditions of ordinary use.

The process consists in immersing the asbestus at any stage in its manufacture or preparation for use in the arts in a solution of a soluble salt, such as the chloride of calcium or the chloride of barium. The asbestus is then dried, after which it is dipped into a solution of a soluble silicate, such as the silicate of soda, or a fluosilicate, or any other solution capable of producing with the first-named solution an insoluble compound. The asbestus is thus treated one or more times, and is finally washed in clean water and dried, when it is ready for use. Asbestus in sheet or board form is prepared in this manner, and forms a highly-efficient septum, diaphragm, or porous partition for use in chemical operations, its merits consisting not only in its practical indestructibility, but also in its uniformly even resistance to the passage or percolation of liquids.

Having described my improved process, what I claim, and desire to secure by Letters Patent, is—

The improved method of preparing sheet asbestus herein described, which consists in immersing the sheet of asbestus in a soluble salt, then drying, and again immersing in a second solution containing a silicate, such as the silicate of soda or a fluosilicate.

CAMILLE ALPHONSE FAURE.

Witnesses:
 WM. B. VANSIZE,
 W. H. SHOURDS.